US009019848B2

(12) United States Patent
Chun et al.

(10) Patent No.: US 9,019,848 B2
(45) Date of Patent: Apr. 28, 2015

(54) METHOD OF MAINTAINING A QUALITY OF SERVICE (QOS) IN A WIRELESS COMMUNICATION SYSTEM

(75) Inventors: Sung-Duck Chun, Gyeonggi-Do (KR); Seung-June Yi, Gyeonggi-Do (KR); Sung-Hoon Jung, Gyeonggi-Do (KR); Sung-Jun Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 116 days.

(21) Appl. No.: 13/259,053

(22) PCT Filed: Apr. 20, 2010

(86) PCT No.: PCT/KR2010/002465
§ 371 (c)(1),
(2), (4) Date: Sep. 22, 2011

(87) PCT Pub. No.: WO2010/123254
PCT Pub. Date: Oct. 28, 2010

(65) Prior Publication Data
US 2012/0014281 A1 Jan. 19, 2012

Related U.S. Application Data

(60) Provisional application No. 61/171,440, filed on Apr. 21, 2009, provisional application No. 61/172,702, filed on Apr. 24, 2009, provisional application No. 61/226,298, filed on Jul. 17, 2009, provisional application No. 61/232,461, filed on Aug. 9, 2009.

(30) Foreign Application Priority Data

Apr. 13, 2010 (KR) .......................... 10-2010-0033989

(51) Int. Cl.
*H04W 24/00* (2009.01)
*H04W 72/08* (2009.01)

(52) U.S. Cl.
CPC .................................. *H04W 72/087* (2013.01)

(58) Field of Classification Search
CPC ..... H04W 24/00; H04W 88/04; H04W 16/26; H04W 84/047; H04W 84/12; H04W 88/06; H04W 88/08; H04W 84/18; H04W 36/18; H04W 36/0011; H04W 36/14; H04W 36/08; H04W 4/00; H04W 88/02; H04B 7/2606; H04B 7/155; H04B 2201/70701
USPC .................. 370/252, 315, 328, 329, 331, 342; 455/73, 432.1
See application file for complete search history.

(56) References Cited

U.S. PATENT DOCUMENTS 8,259,637 B2 * 9/2012 Bertrand et al. .............. 370/315
2004/0037264 A1 2/2004 Khawand
(Continued)

FOREIGN PATENT DOCUMENTS

KR 1020060065458 6/2006
WO 2005/076654 8/2005

*Primary Examiner* — Kwang B Yao
*Assistant Examiner* — Syed M Bokhari
(74) *Attorney, Agent, or Firm* — Lee, Hong, Degerman, Kang & Waimey

(57) ABSTRACT

The present invention relates to a wireless communication system and user equipment providing wireless communication services, and a method of transmitting and receiving data between a terminal and a base station in an evolved Universal Mobile Telecommunications System (UMTS) that has evolved from a Universal Mobile Telecommunications System (UMTS) or a Long Term Evolution (LTE) system, and more particularly, to a method of maintaining a Quality of Service (QoS) in an optimized manner, such that the effective data transmission can be performed with a good quality of service data.

5 Claims, 5 Drawing Sheets

(56) References Cited

U.S. PATENT DOCUMENTS

| | | | |
|---|---|---|---|
| 2005/0186959 A1* | 8/2005 | Vialen et al. | 455/432.1 |
| 2007/0070935 A1 | 3/2007 | Prakash et al. | |
| 2008/0280567 A1* | 11/2008 | Sharma | 455/73 |
| 2009/0225709 A1* | 9/2009 | Wager et al. | 370/329 |
| 2010/0113004 A1* | 5/2010 | Cave et al. | 455/422.1 |
| 2010/0135251 A1* | 6/2010 | Sambhwani et al. | 370/331 |
| 2010/0202311 A1* | 8/2010 | Lunttila et al. | 370/252 |
| 2010/0232364 A1* | 9/2010 | Hsu | 370/328 |
| 2010/0272007 A1* | 10/2010 | Shen et al. | 370/315 |
| 2012/0002589 A1* | 1/2012 | Saifullah et al. | 370/315 |
| 2012/0057530 A1* | 3/2012 | Marinier et al. | 370/328 |
| 2012/0236811 A1* | 9/2012 | Ishii et al. | 370/329 |
| 2013/0051334 A1* | 2/2013 | Sammour et al. | 370/329 |

* cited by examiner

R/R/E/LCID/F/L sub-header with 7-bits L field

R/R/E/LCID/F/L sub-header with 15-bits L field

R/R/E/LCID sub-header

METHOD OF MAINTAINING A QUALITY OF SERVICE (QOS) IN A WIRELESS COMMUNICATION SYSTEM

CROSS-REFERENCE TO RELATED APPLICATIONS

This application is the National Stage filing under 35 U.S.C. 371 of International Application No. PCT/KR2010/002465, filed on Apr. 20, 2010, which claims the benefit of U.S. Provisional Application Nos. 61/171,440, filed on Apr. 21, 2009, 61/172,702, filed on Apr. 24, 2009, 61/226,298, filed on Jul. 17, 2009, and 61/232,461, filed on Aug. 9, 2009, and also claims the benefit of earlier filing date and right of priority to Korean Patent Application No. 10-2010-0033989, filed on Apr. 13, 2010, the contents of which are all hereby incorporated by reference herein in their entirety.

TECHNICAL FIELD

The present invention relates to a wireless communication system and user equipment providing wireless communication services, and a method of transmitting and receiving data between a terminal and a base station in an evolved Universal Mobile Telecommunications System (UMTS) that has evolved from a Universal Mobile Telecommunications System (UMTS), a Long Term Evolution (LTE) system, or a LTE-A (LTE-Advanced) system and more particularly, to a method of maintaining a Quality of Service (QoS) in an optimized manner.

BACKGROUND ART

FIG. 1 shows a network structure of the E-UMTS, a mobile communication system, applicable to the related art and the present invention. The E-UMTS system has been evolved from the UMTS system, for which the 3GPP is proceeding with the preparation of the basic specifications. The E-UMTS system may be classified as the LTE (Long Term Evolution) system.

The E-UMTS network may be divided into an evolved-UMTS terrestrial radio access network (E-UTRAN) and a core network (CN). The E-UTRAN includes a terminal (referred to as 'UE (User Equipment), hereinafter), a base station (referred to as an eNode B, hereinafter), a serving gateway (S-GW) located at a termination of a network and connected to an external network, and a mobility management entity (MME) superintending mobility of the UE. One or more cells may exist for a single eNode B.

FIGS. 2 and 3 illustrate a radio interface protocol architecture based on a 3GPP radio access network specification between the UE and the base station. The radio interface protocol has horizontal layers comprising a physical layer, a data link layer, and a network layer, and has vertical planes comprising a user plane for transmitting data information and a control plane for transmitting control signals (signaling). The protocol layers can be divided into the first layer (L1), the second layer (L2), and the third layer (L3) based on three lower layers of an open system interconnection (OSI) standard model widely known in communication systems.

The radio protocol control plane in FIG. 2 and each layer of the radio protocol user plane in FIG. 3 will now be described.

The physical layer, namely, the first layer (L1), provides an information transfer service to an upper layer by using a physical channel. The physical layer is connected to an upper layer called a medium access control (MAC) layer via a transport channel, and data is transferred between the MAC layer and the physical layer via the transport channel. Meanwhile, between different physical layers, namely, between a physical layer of a transmitting side and that of a receiving side, data is transferred via a physical channel.

The MAC layer of the second layer provides a service to a radio link control (RLC) layer, its upper layer, via a logical channel. An RLC layer of the second layer may support reliable data transmissions. A PDCP layer of the second layer performs a header compression function to reduce the size of a header of an IP packet including sizable unnecessary control information, to thereby effectively transmit an IP packet such as IPv4 or IPv6 in a radio interface with a relatively small bandwidth.

A radio resource control (RRC) layer located at the lowest portion of the third layer is defined only in the control plane and handles the controlling of logical channels, transport channels and physical channels in relation to configuration, reconfiguration and release of radio bearers (RBs). The radio bearer refers to a service provided by the second layer (L2) for data transmission between the UE and the UTRAN.

In general, a terminal (UE) directly communicates with a network (eNB) in a LTE system. However, as a relay node (RN) is introduced in a LTE-A system, the terminal can not directly transmit or receive data with the network. Instead, the data communication must be performed through the relay node. As such, a data transmission delay can be happened due to the introduction of the RN. Further, it is very difficult to maintain a Quality of Service (QoS) in the LTE-A system due to an existence of RN.

DISCLOSURE OF INVENTION

Solution to Problem

Accordingly, an object of the present invention is to provide an improved method of maintaining a Quality of Service (QoS) in a LTE-A system.

To achieve this and other advantages and in accordance with the purpose of the present invention, as embodied and broadly described herein, there is provided A method of maintaining a Quality of Service (QoS) in a wireless communication system, the method comprising: receiving two or more identifiers from a network; receiving logical channel information related with each of the two or more received identifiers; receiving a resource allocated information related to one of the two or more identifiers; generating a data unit using data from a logical channel associated with the one of the two or more identifiers, and transmitting the generated MAC PDU using the resource allocated information.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

The present invention may be applied to a 3GPP communication technology, particularly to a Universal Mobile Telecommunications System (UMTS), system, and a communication device and method thereof. However, the present invention is not limited to this, but may be applied to every wire/wireless communication to which technical spirit of the present invention can be applied.

Hereinafter, the configuration and operation of preferred embodiments according to the present invention will be described with reference to the accompanying drawings.

Figure 1:
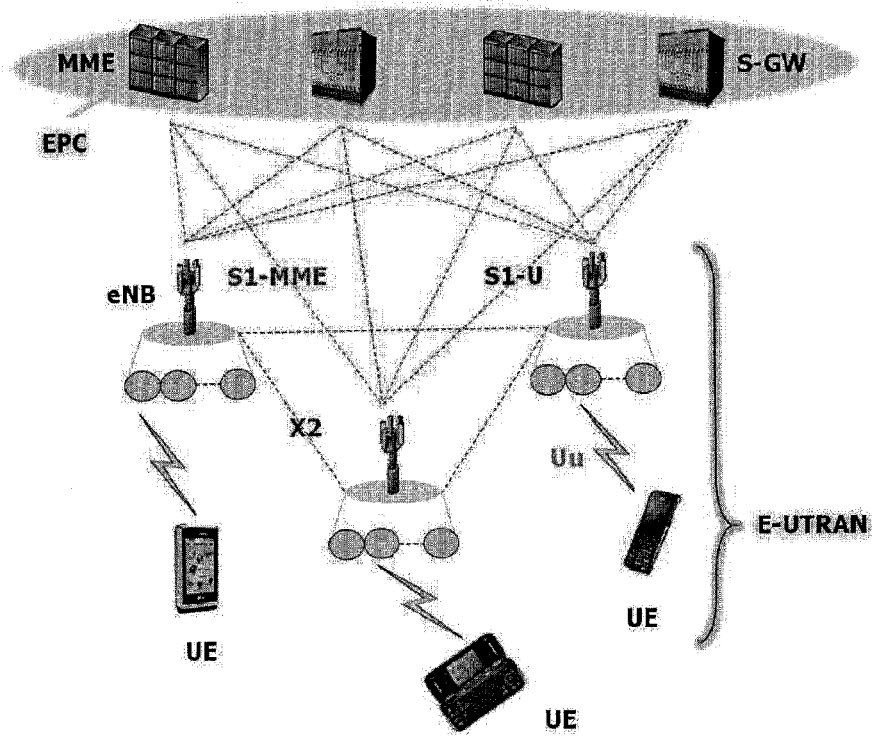
FIG. 1 is a view illustrating a network architecture of E-UTRAN, which is a mobile communication system to which the related art and the present invention are applied.
Figure 2:
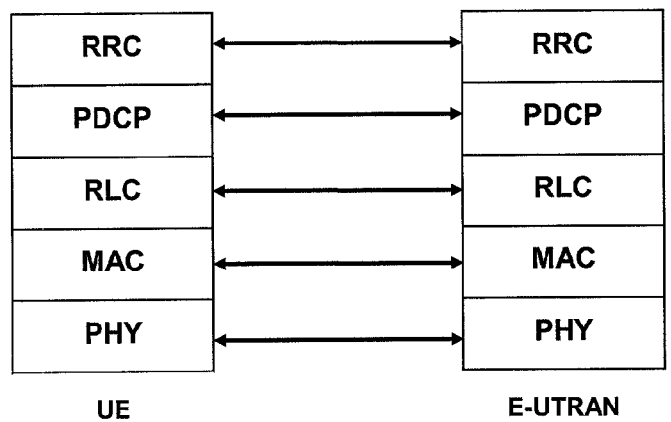
FIG. 2 is an exemplary view illustrating a control plane architecture in a radio interface protocol between UE and E-UTRAN in the related art.
Figure 3:
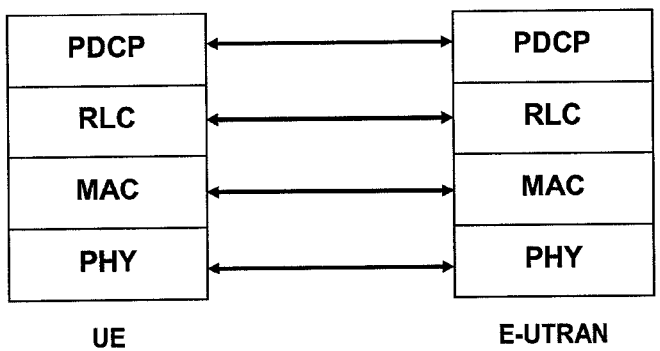
FIG. 3 is an exemplary view illustrating a user plane architecture in a radio interface protocol between UE and E-UTRAN in the related art.
Figure 4:
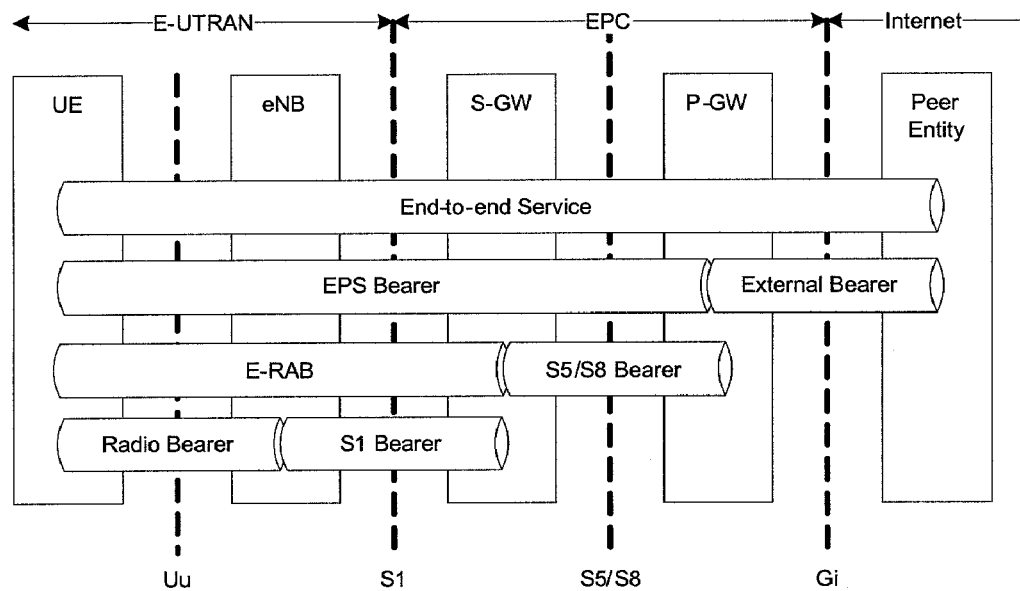
FIG. 4 is an exemplary view illustrating a bearer service structure of a LTE system.

First, a bearer service architecture of the LTE system will be described. FIG. 4 is an exemplary view illustrating a bearer service architecture of the LTE system. Typically, Radio Bearer is a bearer provided in a Uu interface to support the user's service. In 3GPP, each bearer is defined for each interface as illustrated therein to guarantee independence between those interfaces. Specifically, bearers provided by LTE system are commonly called an Evolved Packet System (EPS) bearer, which can be divided into Radio Bearer, S1 Bearer, and the like, for each interface as illustrated in FIG. 4.

In FIG. 4, Packet Gateway (P-GW) is a network node for connecting between the LTE network and another network, and EPS Bearer provided by the LTE system is defined between UE and P-GW. The EPS Bearer is subdivided between individual nodes of the LTE system, and defined as Radio Bearer between UE-eNB, S1 Bearer between eNB-S-GW, and S5/S8 Bearer between S-GW and P-GW. Each bearer is defined through quality of service (QoS), and the QoS may include data rate, error rate, delay, and the like. Accordingly, QoS that should be totally provided by an LTE system is defined as a EPS bearer, and then each QoS is determined for each interface, and the bearer is set for each interface according to the QoS that should be provided by itself. Since the bearer of each interface is provided by dividing a total EPS bearer into sections, the EPS bearer and other bearers, such as Radio Bearer, S1 Bearer, and the like are all one-to-one relationships.

Hereinafter, a Long-Term Evolution Advanced (LTE-A) system will be described. The LTE-A system is a system that has been developed from an LTE system to meet IMT-Advanced conditions, which are the fourth generation mobile communication conditions recommended by the International Telecommunication Union-Radiocommunication Sector (ITU-R). At present, the LTE-A system standard is actively under development by 3GPP that has developed the LTE system standard. Representative technologies newly added in the LTE-A system mi carrier aggregation technology for extending a used bandwidth to be flexibly used, and relay technology for increasing coverage, supporting group mobility, and allowing network arrangement.

Figure 5:
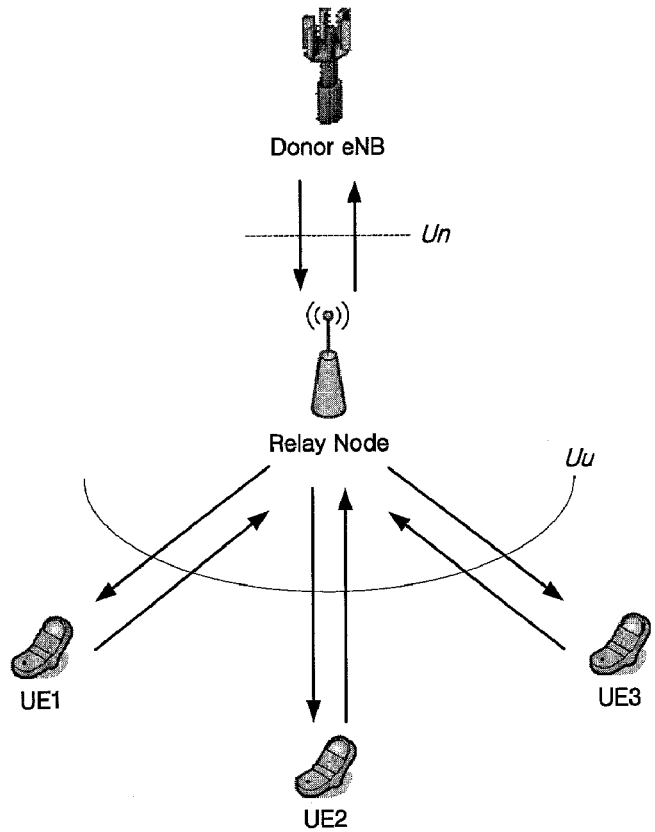
FIG. 5 is an exemplary view illustrating a Relay Node (RN) network structure in a LTE-A (LTE-Advanced) system.

Here, relay is a technology for relaying data between a user equipment (EU) and an Evolved Node B (eNB, base station). Since communication is not smoothly implemented in case where a distance between UE and eNB is far in the LTE system, it is introduced in an LTE-A system as a method of making up for the problem. A new network node, which is referred to as Relay Node (RN), is introduced between UE and eNB to perform such a relay operation, wherein the eNB for managing RN is called Donor eNB (DeNB). In addition, an interface between RN-DeNB that has been newly added due to RN is defined as an Un interface, thereby being differentiated from a Un interface that is an interface between UE and a network node. FIG. 5 illustrates such a concept of Relay Node and an Un interface.

Here, the RN serves to manage UE in behalf of the DeNB. In other words, from a standpoint of the UE, the RN is shown as DeNB, and therefore, MAC/RLC/PDCP/RRC, which is an Uu interface protocol that has been used in a conventional LTE system, are used as they are in a Uu interface between UE-RN.

From a standpoint of the DeNB, the RN may be shown as UE or shown also as eNB according to circumstances. In other words, when the RN is first accessed to the DeNB, it is accessed through random access like UE because the existence of the RN is unknown to the DeNB, but operated like eNB managing UE connected to itself after the RN is once accessed to the DeNB. Accordingly, along with the Uu interface protocol, the functions of the Un interface protocol should be also defined as in the form to which a network protocol function is also added. For the Un interface protocol, discussions as to which functions should be added or changed to each protocol layer on the basis of Uu protocols such as MAC/RLC/PDCP/RRC are still in progress in 3GPP.

Figure 6:
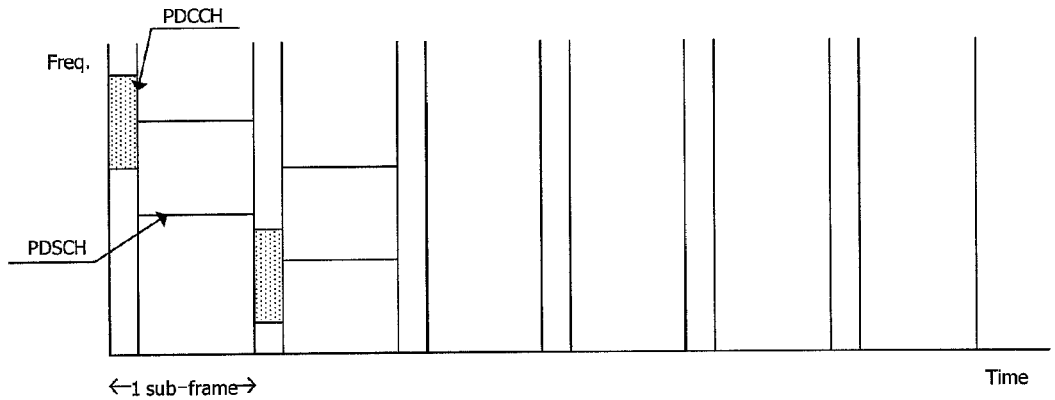
FIG. 6 is an exemplary view illustrating a method of receiving data in downlink.

With reference to FIG. 6, a method for the mobile terminal in an LTE system to receive downlink data will be explained.

On the downlink, there are basically two types of physical channels: PDCCH and PDSCH. The PDCCH is not directly related to transmitting user data, but used in transmitting control information needed for implementing (or using) physical channels. In more basic terms, it can be said that the PDCCH is used in controlling other physical channels. In particular, the PDCCH is used in transmitting information necessary for the mobile terminal to receive the PDSCH. With respect to data that is transmitted at a particular point in time using a particular frequency bandwidth, information about what mobile terminal such data is intended for, the size of such data being transmitted, and the like is transmitted via the PDCCH. Accordingly, each mobile terminal receives the PDCCH at a particular time (e.g., TTI: transmission time interval) and checks whether any data (that should be received) was transmitted. If there is an indication that data (which should be received) was indeed transmitted, the PDSCH is additionally received by using the information (such as the appropriate frequency, etc.) indicated by the PDCCH. It can be said that information indicating as to what mobile terminal (i.e. a single UE or multiple UEs) the data of the PDSCH is being transmitted to, information indicating how the mobile terminal(s) should receive and decode the PDSCH data, and the like are transmitted via a physical channel, i.e. the PDCCH (Physical Downlink Control CHannel).

For example, in a particular sub-frame, let us assume that radio resource information A (e.g. frequency location), transmission format information B (e.g. transmission block size, modulation and coding information, etc.), and RNTI (Radio Network Temporary Identity) information C undergo CRC (Cyclic Redundancy Check) masking and transmitted via the PDCCH. One or more mobile terminals in a corresponding cell use the RNTI information that it has in order to monitor the PDCCH, and referring to the above assumption, for a mobile terminal having RNTI information C, when the PDCCH is decoded, CRC errors do not occur. Accordingly, such mobile terminal uses the transmission format information B and radio resource information A to decode the PDSCH in order to receive data. In contrast, with respect to the above assumption, in a mobile terminal that does not have RNTI information C, CRC errors occur when the PDCCH is decoded, and thus such mobile terminal does not receive the PDSCH.

Through the above procedures, in order to inform about which mobile terminals have been allocated radio resources, a RNTI (Radio Network Temporary Identifier) is transmitted via each PDCCH, and such RNTI can be classified as a dedicated RNTI or a common RNTI. A dedicated RNTI is allocated to a single mobile terminal and is used for transmitting and receiving data corresponding to that mobile terminal. Such dedicated RNTI is only allocated to those mobile terminals having their information registered in the base station (eNB). In contrast, a common RNTI is used by those mobile terminals that do not have their information registered in the base station (eNB) and cannot be allocated a dedicated RNTI, in order to send and receive data with the base station or used for transmitting information (such as system information) that is commonly applied to a plurality of mobile terminal.

As mentioned above, a base station and a terminal construct the E-UTRAN. Radio resources within one cell may be composed of uplink radio resource and downlink radio resource. The base station manages allocation and control of the uplink and downlink radio resources of the cell. That is, the base station determines which radio resource is to be used for which terminal with time information. For example, the base station may determine to allocate a frequency in the range of 100 MHz to 101 MHz to a user 1 after 3.2 seconds, for a downlink data transmission for 0.2 seconds. After the determination, the base station informs the corresponding terminal of such information, such that the terminal can receive the downlink data. Similarly, the base station may determine when and which terminal is allowed to transmit uplink data using how many and which radio resources. The base station may then inform the corresponding terminal of the determination such that the terminal can transmit the uplink data using the radio resources for the corresponding time.

Unlike the related art, the dynamic management of radio resources by the data station allows the efficient use of radio resources. The related art technique is configured such that one terminal keeps using one radio resource during a call connection. This technique is irrational, considering that many services are recently provided based upon an internet protocol (IP) packet. It is because most packet services do not continuously generate packets during a call connection but contain non-transmission intervals during the call connection. In spite of this, the continuous allocation of radio resources to one terminal is inefficient. To solve the problem, the E-UTRAN system employs the aforesaid method for allocating a radio resource to a terminal, while service data exists, only when the terminal needs the radio resource.

In more detail, in order to efficiently use radio resources in the LTE system, the base station should know what kind of data and how many data each user wants to send. For downlink data, it is transferred from an access gateway to the base station. The base station thus knows how many downlink data should be transferred to each user. On the other hand, for uplink data, if a terminal does not inform the base station of information related to uplink data that it wants to send, the base station cannot know how many uplink data each terminal needs. Hence, in order for the base station to appropriately allocate uplink radio resources to terminals, each terminal should provide the base station with information required for scheduling radio resources.

To this end, a terminal informs to the base station if it has data to send, and the base station sends a radio resource allocation message to the terminal based upon the information.

At the process, namely, when the terminal informs the base station that it has data to send, the terminal informs the base station of the amount of data stored in its buffer, which is called as a buffer status report (BSR).

However, the BSR is generated in the format of a MAC control element (MAC CE) and included in a MAC PDU to be transmitted from the terminal to the base station. That is, an uplink radio resource is required for the BSR transmission, which means that uplink radio resource allocation request information for the BSR transmission should be sent. When the BSR is generated, if there is an uplink radio resource allocated, the terminal immediately sends the BSR using the uplink radio resource. However, when the BSR is generated, if there is no uplink radio resource allocated, the terminal performs a scheduling request (SR) procedure (i.e., resource allocation request procedure).

The SR procedure may be divided into two ways, namely, a method using a dedicated scheduling request (D-SR) channel set for a physical uplink control channel (PUCCH) and a method using a RACH procedure. That is, once the SR procedure is triggered, if the terminal has an allocated D-SR channel, then the terminal uses the D-SR channel to send a radio resource allocation request. If the terminal does not have the D-SR channel allocated thereto, then the terminal starts the RACH procedure. In case of using the D-SR channel, the terminal sends a radio resource request allocation signal on uplink via the D-SR channel. The SR procedure may be continuously performed until the terminal is allocated with a UL-SCH resource.

In LTE system, a HARQ operation is performed in a MAC (Medium Access Control) layer for an effective data transmission. The following is a detailed description of the HARQ operation.

Figure 7:
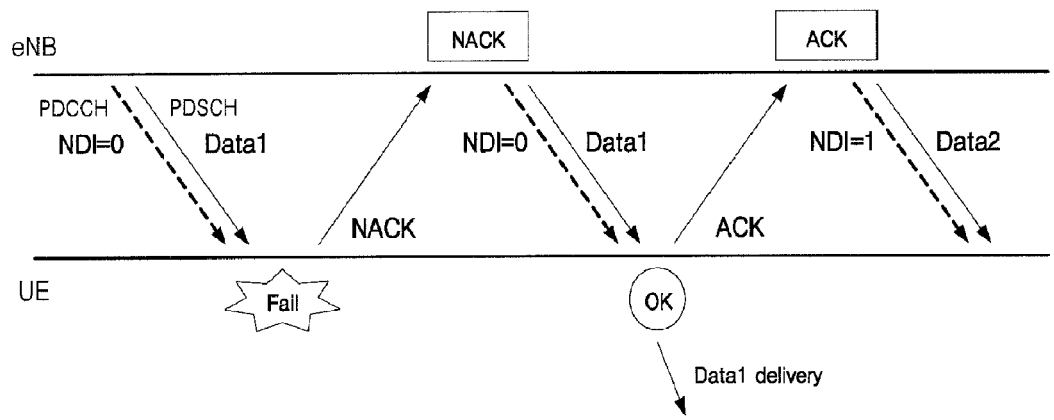
FIG. 7 is an exemplary view illustrating a procedure for a HARQ operation in a MAC layer of LTE system.

FIG. 7 is an exemplary view showing a HARQ operation method for an effective data transmission. As illustrated in FIG. 7, a base station (or eNB) may transmit downlink scheduling information (referred as 'DL scheduling information' hereafter) through a PDCCH (Physical Downlink Control Channel) in order to provide data to a terminal (UE) during a HARQ operation. The DL scheduling information may include a UE identifier (UE ID), a UE group identifier (Group ID), an allocated radio resource assignment, a duration of the allocated radio resource assignment, a transmission parameter (e.g., Modulation method, payload size, MIMO related information, etc), HARQ process information, a redundancy version, or a new data indicator (NID), etc.

Here, the DL scheduling information may be transmitted through a control channel such as a PDCCH, and the DL scheduling information may be varied with a channel conditions or circumstances. For example, if a current channel condition is better than a channel condition of an initial transmission, higher bit rate may be used by manipulating a modulation scheme or a payload size. In contrast, if a current channel condition is worst than a channel condition of an initial transmission, lower bit rate may be used.

The terminal checks the DL scheduling information by monitoring a PDCCH in every TTI. Then, the terminal receives data through a PUSCH based on the DL scheduling information. Once the terminal receives the data, the received data is stored in a soft buffer, and then the terminal attempts to decode the stored data. If the terminal successfully decodes the data, the terminal transmits an ACK signal to the base station. If the terminal does not successfully decode the data, the terminal transmits a NACK signal to the base station. After that, if the base station receives the ACK signal from the terminal, the base station transmits a next data with an assumption that previous data transmission was successfully performed. If the base station receives the NACK signal, the base station retransmits same data with a same transmission format or a different transmission format. After the NACK signal is transmitted to the base station by the terminal, the terminal transmitted the NACK signal would expect to receive a retransmission of the data. Here, the value in the NDI (New Data Indicator) field contained in the PDCCH may be used for the UE to determine whether the received data is an initial transmission data or a retransmitted data. More specifically, the NDI field is 1 bit field that toggles every time a new data is transmitted or received. (0→1→0→1→ . . . ) As such, the value in the NDI for the retransmitted data always has a same value used in an initial transmission. From this, the UE may know an existence of retransmitted data by comparing these values.

In LTE system, a synchronous HARQ is employed for the uplink direction (from terminal to base station). Here, the synchronous HARQ refers to a technique where the time interval for each data transmission is the same. Namely, when the terminal should perform retransmission after an original transmission, such retransmission occurs at a certain time after the original transmission. As such, using the same time interval reduces any waste of radio resources that would be needed if scheduling information is transmitted using the PDCCH at various different retransmission points of time, and also results in a decrease in situations where the terminal cannot perform appropriate retransmissions because the PDCCH was not properly received.

In such synchronous HARQ procedure, values indicating the maximum number of transmissions and the maximum number of retransmissions are used.

The maximum number of transmissions is a value that is one greater than the maximum number of retransmissions (i.e. Max. # of re-Tx=Max. # of Tx+1), and both values have the same purpose. Namely, these values indicate the maximum number of times that a particular data block can be transmitted (or retransmitted) through HARQ. A maximum number of retransmissions is provided in order to minimize the delays or bottleneck in transferring data that would occur if retransmissions were unlimited, and to consider the mobile communications environment that requires sharing of radio resources among multiple users.

If the terminal receives a NACK signal from the base station with respect to its original transmission, retransmissions are performed and if the maximum number of retransmissions is reached (but still unsuccessful), further transmission of the corresponding data is stopped and such data is deleted from the buffer.

Figure 10:
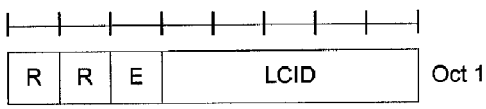
FIG. 10 is an another exemplary view illustrating a MAC sub-header format used in the MAC entity.
Figure 11:
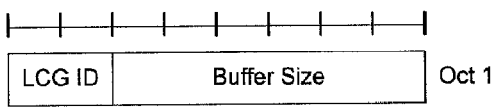
FIG. 11 is an exemplary view illustrating a short BSR and a truncated BSR of MAC control element.

The structure of the MAC PDU (Medium Access Control Protocol Data Unit) used for a MAC entity will now be described. FIG. 10 shows a format of the MAC PDU used for the MAC entity. In FIG. 10, an LCID informs to which logical channel a corresponding MAC SDU corresponds, and 'L' field informs about the size of the corresponding MAC SDU. An 'E,' field informs whether or not there are additional headers. In the process, if the size of the corresponding MAC SDU or a MAC control element is larger than 127, the 'L' field of 15 bits is used. For a MAC sub-header with respect to the MAC SDU included in a MAC PDU or for a size-fixed MAC control element, a MAC sub-header in the form as shown in FIG. 10 is used. For other cases, a MAC sub-header in the form as shown in FIG. 11 is used.

Figure 8:
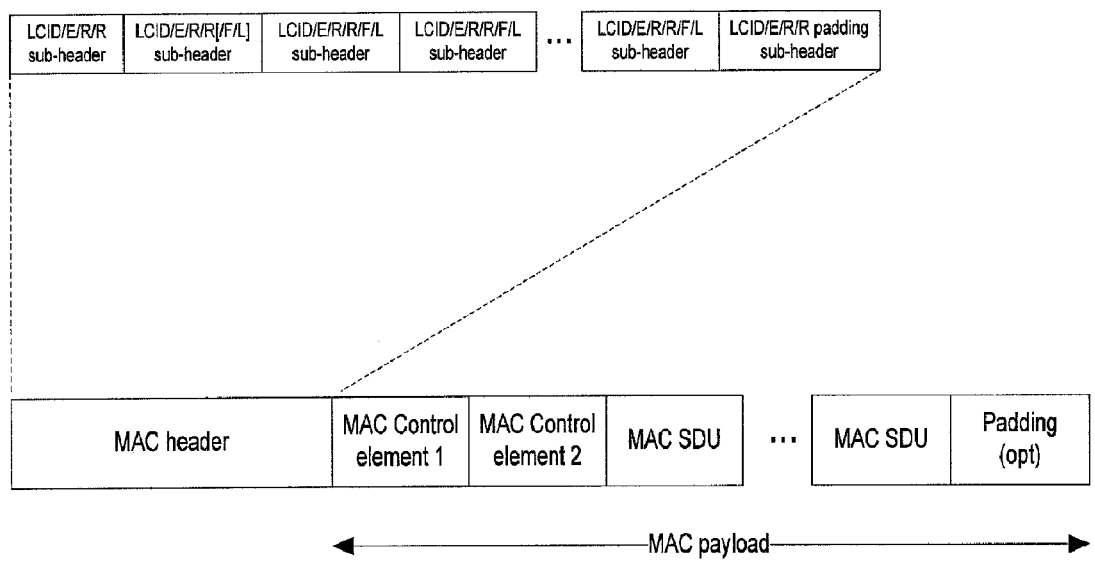
FIG. 8 is an exemplary view illustrating a PDU format used in a MAC entity.
Figure 9:
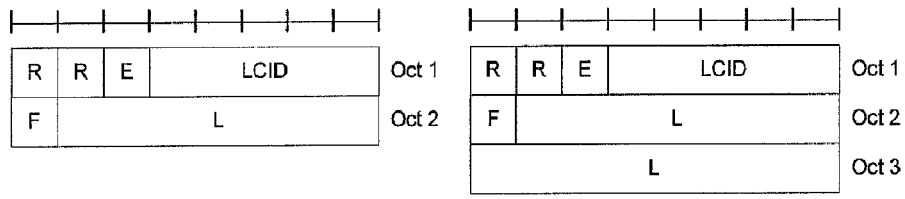
FIG. 9 is an exemplary view illustrating a MAC sub-header format used in the MAC entity.

Each field as used in FIG. 8-10 will now be described in detail as follows.

LCID: It informs about a logical channel to which a corresponding MAC SDU belongs, or which information a corresponding MAC CE (MAC Control Element) includes.

E: It informs about whether or not there is another MAC sub-header after the current MAC sub-header.

F: It informs about the length of a subsequent 'L' field.

R: It is a reserved bit which is not in use.

Here, information about the values used for the LCID may be shown as the below tables.

TABLE 1

LCID values for DL-SCH

| Index | LCID values |
| --- | --- |
| 00001-xxxxx | Identity of the logical channel |
| xxxxx-11011 | Reserved |
| 11100 | UE Contention Resolution Identity |
| 11101 | Timing Advance |
| 11110 | DRX Command |
| 11111 | Padding |

TABLE 2

LCID values for UL-SCH

| Index | LCID values |
| --- | --- |
| 00000-yyyyy | Identity of the logical channel |
| yyyyy-11011 | Reserved |
| 11100 | Power Headroom Report |

TABLE 2-continued

LCID values for UL-SCH

| Index | LCID values |
|---|---|
| 11101 | Short Buffer Status Report |
| 11110 | Long Buffer Status Report |
| 11111 | Padding |

Figure 12:
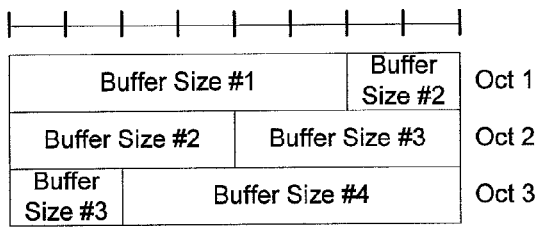
FIG. 12 is an exemplary view illustrating a long BSR of MAC control element.

FIGS. 11 and 12 illustrate BSR (Buffer Status Report) formats. Specifically, FIG. 11 is an exemplary view illustrating a short BSR and a truncated BSR of MAC control element and FIG. 12 is an exemplary view illustrating a long BSR of MAC control element. The short BSR or long BSR is selectively used based on a number of logical channel group having the data and a size of available space in the MAC PDU.

Figure 13:
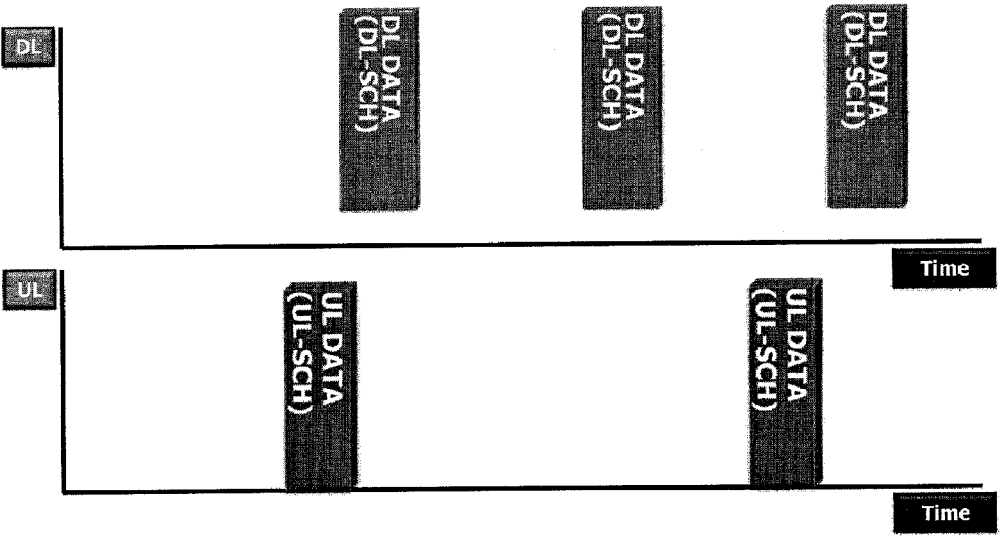
FIG. 13 is an exemplary view illustrating a semi-persistent radio resource scheduling.

A semi-persistent scheduling (or a semi-persistent radio resource allocation method) or semi-permanent scheduling (or a semi-permanent radio resource allocation method) will now be described. FIG. 13 is an exemplary view illustrating a semi-persistent radio resource scheduling.

In general, the UE transmits data to the base station through the process including: 1) the UE requests radio resources required for transmitting generated data from the base station, 2) the base station allocates radio resources through a control signal according to the UE request for radio resources, and 3) the UE transmits the data to the base station through the allocated radio resources. However, in the VoIP service, in general, small packets of uniform size are frequently and regularly transmitted. So, the effective radio resource allocation scheme can be applied in consideration of such characteristics. Namely, the semi-permanent scheduling is also one of radio resource allocation schemes optimized for a VoIP service. In this method, transmission of information regarding allocation of radio resources is omitted. In more detail, when VoIP starts, a packet size and period of RTP are previously determined and radio resources are permanently allocated. Accordingly, the UE may immediately perform the process of transmitting data without the first and second steps, namely, without the radio resource requesting step and the radio resource allocation step, as mentioned above, according to such setting of resource resources. That is, in the semi-persistent scheduling, there is no need to transmit radio resource allocation information via a PDCCH. Without receiving the PDCCH each time, the UE can periodically receive particular radio resources or transmit data by using particular radio resources according to pre-set information.

Figure 14:
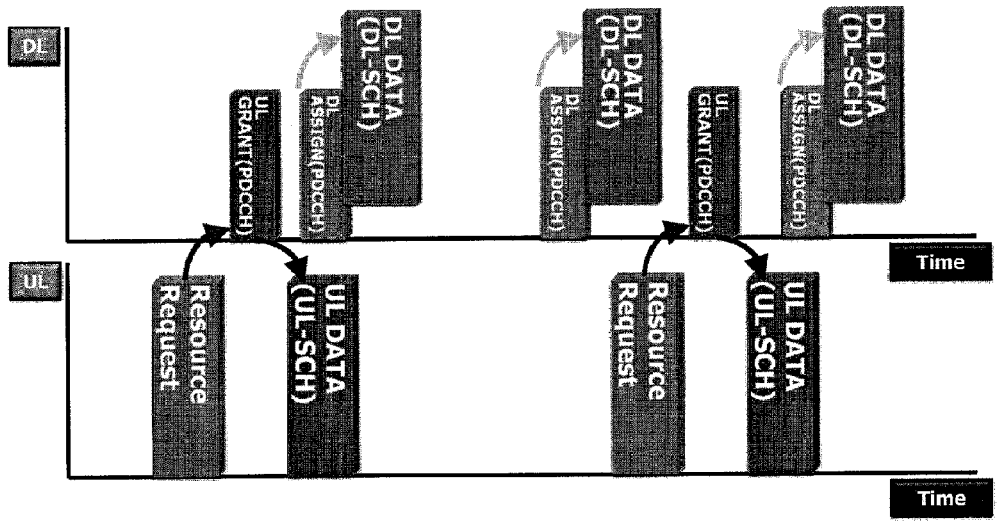
FIG. 14 is an exemplary view illustrating a dynamic radio resource scheduling.

Meanwhile, the dynamic scheduling is a method for informing about radio resources to be received or to be transmitted by the UE each time. FIG. 14 is an exemplary view illustrating a dynamic radio resource scheduling. The base station may selectively set a dedicated scheduling request channel (D-SR Channel) for the UE. The D-SR channel may transmit 1-bit information at uniform time intervals.

As aforementioned, in a LTE system, a terminal (UE) directly communicates with a network (eNB) in a LTE system. However, as a relay node (RN) is introduced in a LTE-A system, the terminal can not directly transmit or receive data with the network. Instead, the data communication must be performed through the relay node. As such, a data transmission delay can be happened due to the introduction of the RN. Further, it is very difficult to maintain a Quality of Service (QoS) in the LTE-A system due to an existence of RN. In the LTE system, when the terminal transmits the data in an uplink direction, the terminal generates a MAC PDU based on radio resource(s) allocated from the base station (eNB), and transmits the generated MAC PDU to the base station. Here, the terminal does not generate the MAC PDU using a data stored in one logical channel. Rather, the terminal generates the MAC PDU with consideration of data amount stored in each logical channels and a transmittable data amount in each logical channels. Namely, each MAC PDU may be generated with differently characterized data from each logical channel. And, such generated MAC PDU is transmitted through same HARQ operation.

The simplest scenario is a case where one radio bearer (RB) for VoIP traffic and one RB for TCP are established for one terminal (UE). When data for each RB are simultaneously available and data from both RBs are multiplexed into same MAC PDU, the MAC PDU will be transmitted either using the QoS parameter set for the VoIP or using the QoS parameter set for the TCP. In this case, if the QoS parameter such as low HARQ retransmission number is used, more retransmission should be performed at RLC level for TCP traffic. If the QoS parameter such as high HARQ retransmission number is used, unnecessary retransmission leading to more consumption of radio resource for VoIP traffic is unavoidable.

In LTE-A system, such operation may cause following problems.

First of all, over the interface between DeNB and UE in the LTE-A system, the UE can transmit more than one transport block to the DeNB due to the introduction of carrier aggregation technique. If the UE is simultaneously allocated with radio resource per each activated carrier, the UE has to generate more than one MAC PDU at the same time. The generation of multiple MAC PDUs is impossible with LTE because neither carrier aggregation is used nor MIMO is used in Uplink direction.

Secondly, over the interface between DeNB and RN, the RN had to manage simultaneously multiple UEs. Due to the increase of the number of the UE which the RN should handle, the amount of traffic over the Un interface will be much larger and heavier than the amount of traffic that average UE generates. Thus, the amount of radio resources that one RN requires at each TTI is not trivial from the viewpoint of entire cell resource. In this case, even only one unnecessary retransmission will decrease overall cell throughput.

Even if each UE generates only one kind of traffic over Uu interface, the RN should treat different kind of traffic due to the multiplexing over the Un interface. Furthermore, the time when each type of traffic is generated is random and the ratio of each traffic to overall traffic changes dynamically. For this situation, if the RN cannot adapt HARQ operating point optimized for the data included in the MAC PDU, the efficiency of radio resource use will be lower.

Accordingly, the present invention may propose an effective method for maintaining a Quality of Service in a LTE-A system. More specifically, the present invention may propose to transmit or receive a plurality of data block simultaneously between the relay node (RN) and base station. In this proposal, each data block of the plurality of data block may be transmitted with a different quality of service. For example, each data block (e.g., MAC PDU) may be transmitted with a different physical channel state variable such as a maximum transmission number.

Figure 15:
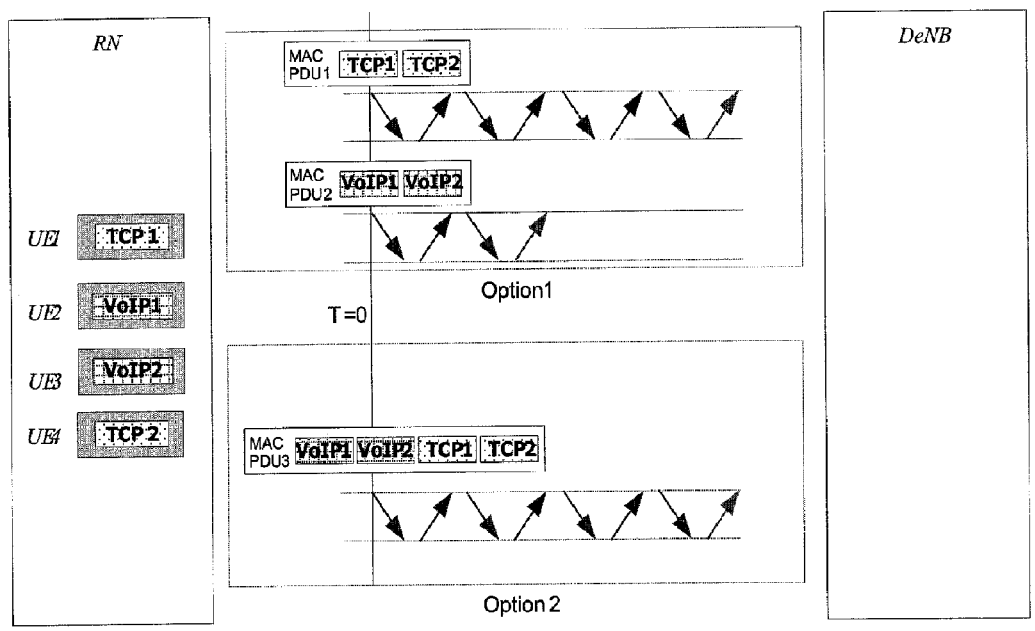
FIG. 15 is an exemplary view illustrating an improved method of maintaining a Quality of Service (QoS) by a Relay Node (RN) in a LTE-A system according to the present invention.

FIG. 15 is an exemplary view illustrating an improved method of maintaining a Quality of Service (QoS) by a Relay Node (RN) in a LTE-A system according to the present invention.

As shown in the FIG. 15, in option 2, only one MAC PDU (MAC PDU 3) is transmitted between the RN and eNB (DeNB). As such, differently characterized data (i.e., VoIP, TCP) are included in one MAC PDU. However, as shown in option 1, each of the differently characterized data is included in each MAC PDU of the plurality of the MAC PDU. For example, the MAC PDU 1 includes the TCP data only while the MAC PDU 2 includes the VoIP data. As each MAC PDU includes same or similarly characterized data, each MAC PDU may be transmitted with an optimized radio resource configuration. For example, the radio resource configurations for the MAC PDU 1 and the MAC PDU 2 may be set differently for an optimized data transmission performance. According to the present invention, a quality of service can be maintained with an effective usage of the radio resource(s).

During the above procedure, a plurality of RNTI (Radio Network Temporary Identity) may be allocated to a relay node (RN). In this case, each RNTI may be configured or related with a QoS parameter, a radio bearer, a radio bearer group, or a QoS class identifier (QCI), etc. And, the QoS parameter, the radio bearer, the radio bearer group, or the QoS class identifier (QCI) related to each RNTI may be used for a data communication. For example, in FIG. 15, a RNTI 1 for a VoIP data transmission and a RNTI 2 for a TCP data transmission may be utilized. If the relay node is allocated with radio resource(s) with the RNTI 1, the allocated radio resource(s) (e.g., a radio bearer or logical channels) related with the RNTI 1 may be used for the VoIP data transmission. If the relay node is allocated with radio resource(s) with the RNTI 2, the allocated radio resource(s) (e.g., a radio bearer or logical channels) related with the RNTI 2 may be used for the TCP data transmission.

During the above procedure, if data related to the RNTI does not use all of the allocated radio resource(s), the allocated radio resource(s) may be used for other radio bearer, other radio bearer group, other QoS parameter, or other QCI. Here, the radio bearer may be replaced with a priority, a filter (i.e., IP address, port number), a service type, a user/UE list, etc. In other words, when the DeNB allocates the radio resource(s) to the relay Node (RN), the DeNB may notify the RN that which type of data should use the radio resource(s). Namely, when the radio resource is allocated to the RN by the DeNB, the RN may use the allocated radio resource(s) only for a specific type of data, which was indicated by the DeNB. Here, information of the radio bearer, the radio bearer group, the QoS parameter, the QCI, the priority, the filter, the service type, or the user/UE list, may be utilized for the DeNB to indicate the specific type of data.

The relay node (RN) usually relays data of UEs to the DeNB via an UN interface. However, in some case, the RN transmits or receives its own data to the DeNB. As such, these two types of data should be effectively distinguished. In order to achieve this, the present invention proposes to use a special logical channel ID (LCID) value. That is, the special LCID value is set, and this LCID value is used to indicate a type of data transmitted via the Un interface. Namely, if the data is the RN's own used data, the RN sets a LCID of a MAC sub-header with the special LCID value such that the DeNB can be identified the type of data. Similarly, another special LCID value may be used for indicating the data of UEs.

Further, in order to effectively distinguish the two types of data, the present invention proposes to utilize an R bit in the MAC sub-header. In particular, the type of data can be identified based on an existence of R bit in the MAC sub-header. For example, if the R bit is set in the MAC sub-header, this setting of the R bit may be used to indicate the DeNB that the type of data transmitted via the Un interface is the RN's own used data. Similarly, if the R bit is not set in the MAC sub-header, such absence of the R-bit setting may be used to indicate the DeNB that the type of data transmitted via the Un interface is the data of UEs.

Also, in order to effectively distinguish the two types of data, the present invention proposes to use a plurality of RNTI. That is, the plurality of RNTI is allocated to the RN, and the plurality of RNTI may be used to indicate the type of data. For example, if the data is the RN's own used data, the RN may use a specific RNTI designated for the Un interface such that the DeNB can be identified the type of data. Similarly, a RNTI designated for the non-Un interface may be used for indicating the data of UEs.

The present invention further proposes to configure a plurality of D-SR channel. Here, each of the plurality of D-SR channel may be mapped to a different radio bearer, a different radio bearer group, a different QoS parameter, a different QCI, a different priority, or different UE. Further, each of the D-SR channels may be used independently. For example, the RN may configure a D-SR channel 1 and a D-SR channel 2, where the D-SR channel 1 is mapped to a radio bearer 1 and the D-SR channel 2 is mapped to a radio bearer 2. In this case, if the data is arrived at the radio bearer 1 or if a BSR trigger condition of the radio bearer 1 or D-SR channel 1 is satisfied, the D-SR channel 1 will be triggered and transmitted. Similarly, if the data is arrived at the radio bearer 2 or if a BSR trigger condition of the radio bearer 2 or D-SR channel 2 is satisfied, the D-SR channel 2 will be triggered and transmitted. Namely, the D-SR 1 channel and the D-SR 2 channel are independently triggered and transmitted when a triggering condition of a QoS, QCI, a logical channel, or priority for each of D-SR channel is satisfied.

The present invention further proposes to configure radio resource(s) allocated by a plurality of semi-persistent radio resource scheduling. Here, each radio resource allocated by the plurality of semi-persistent radio resource scheduling, may be mapped to a different radio bearer, a different radio bearer group, a different QoS parameter, a different QCI, a different priority, or different UE. For example, the RN may configure a radio resource 1 and a radio resource 2, where the radio resource 1 is mapped to a radio bearer 1 and the radio resource 2 is mapped to a radio bearer 2. In this case, if the data is arrived at the radio bearer 1, the RN may use the radio resource 1 for transmitting the data. Similarly, if the data is arrived at the radio bearer 2, the RN may use the radio resource 2 for transmitting the data. Namely, the radio resource 1 and the radio resource 2 are independently used to transmit the data in associated with a QoS, QCI, a logical channel, or priority of each radio resource.

The present invention may provide a method of maintaining a Quality of Service (QoS) in a wireless communication system, the method comprising: receiving two or more identifiers from a network; receiving logical channel information related with each of the two or more received identifiers; receiving a resource allocated information related to one of the two or more identifiers; generating a data unit using data from a logical channel associated with the one of the two or more identifiers, and transmitting the generated MAC PDU using the resource allocated information, wherein the two or more identifiers are Radio Network Temporary Identifiers (RNTIs), the data unit is a Medium Access Control (MAC) data unit, the MAC data unit is a MAC Protocol Data Unit (PDU), the all steps are performed in a Relay Node (RN), the all steps are applied in a LTE-A (LTE-Advanced) system, and the logical channel information indicate a mapping between the two or more identifiers and logical channels.

Hereinafter, a terminal according to the present invention will be described.

A terminal according to the present invention may includes all types of terminals capable of using services that can transmits and/or receives data to and/or from each other in a wireless environment. In other words, a terminal according to the present invention may be used in a comprehensive meaning by including a mobile communication terminal (for example, user equipment (UE), portable phone, cellular phone, DMV phone, DVB-H phone, PDA phone, PTT phone, and the like), a notebook, a laptop computer, a digital TV, a GPS navigation, a portable gaming device, an MP3, other home appliances, and the like.

A terminal according to the present invention may include a basic hardware architecture (transmission and/or reception unit, processing or control unit, storage unit, and the like) required to perform the function and operation for effectively receiving the system information as illustrated in the present invention.

The method according to the present invention as described above may be implemented by software, hardware, or a combination of both. For example, the method according to the present invention may be stored in a storage medium (for example, internal memory, flash memory, hard disk, and the like, in a mobile terminal or base station), and may be implemented through codes or instructions in a software program that can be implemented by a processor (for example, microprocessor, in a mobile terminal or base station), and the like.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of maintaining a Quality of Service (QoS) in a wireless communication system, the method performed by a relay node (RN) and comprising:
   receiving, by the RN and from a base station, two or more radio network temporary identifiers (RNTIs) of each user equipment (UE);
   receiving, by the RN, information on a plurality of logical channels, each of which is related to one of the two or more received RNTIs from the base station;
   generating, by the RN, a first data unit including a voice over Internet protocol (VoIP) based data from a first logical channel associated with a first RNTI of the two or more received RNTIs;
   generating, by the RN, a second data unit including a transmission control protocol (TCP) based data from a second logical channel associated with a second RNTI of the two or more received RNTIs;
   generating, by the RN, a third data unit including data generated for the RN itself; and
   transmitting the generated first, second and third data units, wherein:
   when the third data unit is to be transmitted to the base station, the third data unit includes:
      a logical channel identifier (LCID) field in which a first special value is set to indicate that the third data unit is generated for the RN itself; and
      a reserved field for indicating that the third data unit is generated for the RN itself; and
   when each of the first and second data units is to be transmitted to a specific UE:
      each of the first and second data units includes the LCID field in which a second special value that is different from the first special value is set to indicate that each of the first and second data units is generated for the specific UE; and
      each of the first and second data units does not include the reserved field thereby to indicate that each of the first and second data units is generated for the specific UE.

2. The method of claim 1, wherein the data unit is a Medium Access Control (MAC) data unit.

3. The method of claim 2, wherein the MAC data unit is a MAC Protocol Data Unit (PDU).

4. The method of claim 1, wherein the method is performed in an LTE-A (Long Term Evolution-Advanced) system.

5. The method of claim 1, wherein the logical channel information indicates mapping between the two or more identifiers and logical channels.

* * * * *